(12) United States Patent
Niemi

(10) Patent No.: US 8,998,023 B2
(45) Date of Patent: Apr. 7, 2015

(54) SPHERICAL OBJECT FORMED OF SEVERAL JOINT PARTS AND METHOD FOR PRODUCING SPHERICAL OBJECT FORMED OF SEVERAL JOINT PARTS

(75) Inventors: Pertti Niemi, Vaasa (FI); Juha Ari Niemi, legal representative, Vaasa (FI)

(73) Assignee: Vaasaball LNG Products Oy (FI)

( * ) Notice: Subject to any disclaimer, the term of this patent is extended or adjusted under 35 U.S.C. 154(b) by 190 days.

(21) Appl. No.: 13/697,490

(22) PCT Filed: Apr. 29, 2011

(86) PCT No.: PCT/FI2011/050395
§ 371 (c)(1),
(2), (4) Date: Jul. 3, 2013

(87) PCT Pub. No.: WO2011/141620
PCT Pub. Date: Nov. 17, 2011

(65) Prior Publication Data
US 2013/0316186 A1    Nov. 28, 2013

(30) Foreign Application Priority Data
May 12, 2010   (FI) .................................... 20105520

(51) Int. Cl.
| F17C 1/00 | (2006.01) |
| B32B 3/14 | (2006.01) |
| B23K 31/02 | (2006.01) |
| B23K 33/00 | (2006.01) |
| B21D 51/08 | (2006.01) |

(52) U.S. Cl.
CPC . *B32B 3/14* (2013.01); *B23K 31/02* (2013.01); *B23K 33/004* (2013.01); *B21D 51/08* (2013.01)

(58) Field of Classification Search
CPC ............. B21D 51/08; B65D 7/38; B32B 3/14
USPC .................................... 220/628, 678; 52/81.1
See application file for complete search history.

(56) References Cited

U.S. PATENT DOCUMENTS

| 7,228,671 B1 * | 6/2007 | McCarten .................... 52/653.1 |
| 2007/0039254 A1 * | 2/2007 | Onda ............................. 52/81.1 |

FOREIGN PATENT DOCUMENTS

| CN | 1714994 A | 1/2006 |
| CN | 201317477 | 9/2009 |
| DE | 932945 C | 9/1955 |
| GB | 660418 A | 11/1951 |
| RU | 2019347 C1 | 9/1994 |
| SU | 1407739 A1 | 7/1988 |

OTHER PUBLICATIONS

D Skarin et al., MIG welding guide, "Robotic equipment for MIG welding" ABB Automation Technologies AB, Sweden, Apr. 2006, pp. 221-239, Woodhead Publishing Limited.

* cited by examiner

*Primary Examiner* — Anthony Stashick
*Assistant Examiner* — Mollie Llewellyn
(74) *Attorney, Agent, or Firm* — Kolisch Hartwell, P.C.

(57) ABSTRACT

A spherical object formed of several joint parts and a method for producing a spherical object formed of several joint parts, where the spherical object includes at least twenty pieces of hexagonal panel type elements and at least twelve pieces of pentagonal panel type elements. The radius of curvature of each panel type element is shaped in such a way that, when assembled, the elements make up a hollow spherical object with a radius of not less than 1.5 meters. Each panel type element is additionally provided with an attachment and handling cap.

8 Claims, 9 Drawing Sheets

Figure 1:
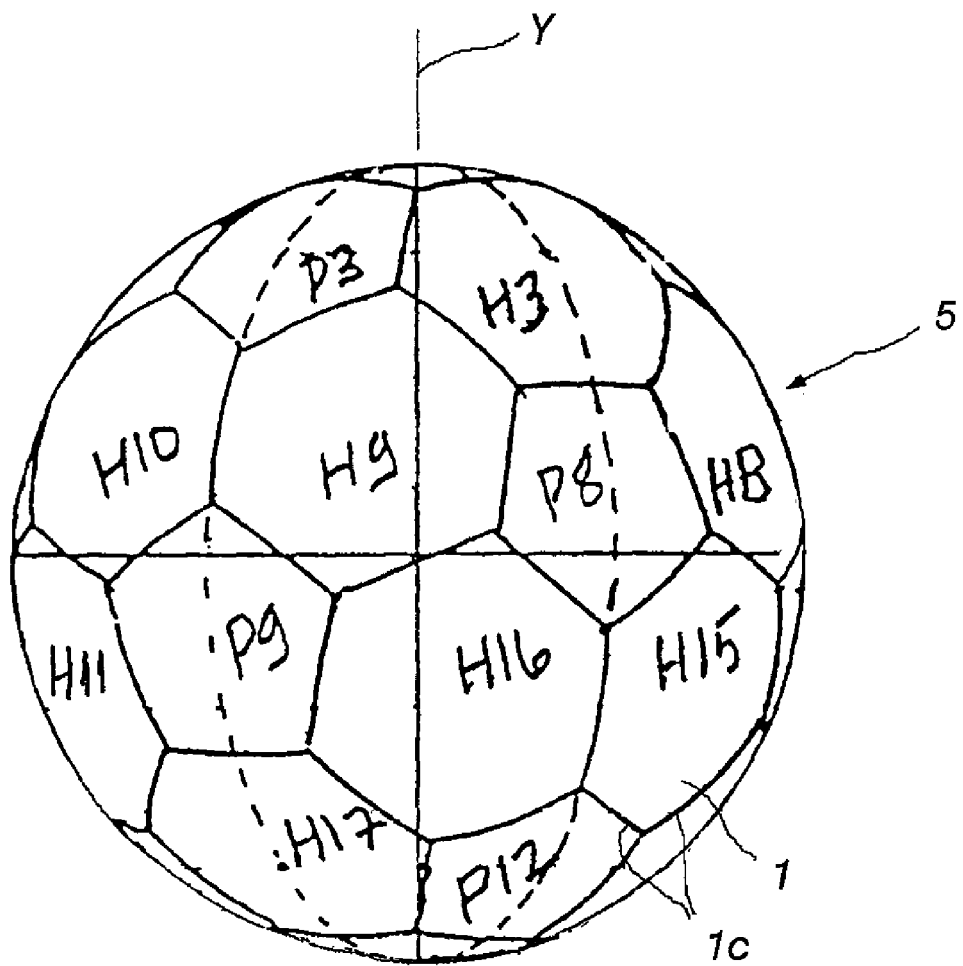

SPHERICAL OBJECT FORMED OF SEVERAL JOINT PARTS AND METHOD FOR PRODUCING SPHERICAL OBJECT FORMED OF SEVERAL JOINT PARTS

The present invention relates to a spherical object formed of several joint parts.

In addition, the invention relates to a method for producing a spherical object formed of several joint parts.

Prior known are ball-shaped objects or spherical objects composed of a plurality of segments for a wide variety of applications, the fabrication of which from several segments is appropriate because of a large size and/or manufacturing technique thereof. Such spherical objects include for example footballs with a comparatively small radius. The football surface consists of polygonal pieces of leather, which are typically handcrafted together and which are fashioned to a spherical shape by an internal air-filled rubber ball. Another notable, quite different example is represented by steel-surfaced spherical containers used for example in ocean-going vessels as liquid gas shipping tanks or storage tanks. Such containers are typically about 10-40 meters in outer diameter, which facilitates the fabrication of container skins from small joint parts (steel panels) in terms of production engineering.

The parts to be connected together and making up a spherical object are of such a shape that the forming spherical object is inconvenient to handle and the joining (welding) of parts to each other is difficult and requires special equipment for shifting the parts to be joined in order to position and holding the same in place. At present, the fabrication of a spherical object requires persons with several special skills, such as for example operators of the equipment for handling the parts, as well as welders. The parts to be joined together are of such a shape that the automation of a spherical object fabrication process is very difficult.

An object of the present invention is to provide a spherical object capable of obviating the above drawbacks. In other words, an object of the invention is to provide a spherical object with a type of joint parts that enable the fabrication of a large radius spherical object in a simpler and faster, and hence also cheaper manner with respect to the prior art. Another object of the invention is to provide a spherical object which enables, with respect to the prior art, the automation as advanced as possible for joining together the parts to be attached to each other.

The foregoing object of the invention is fulfilled according to the present invention in such a manner that the spherical object's parts include at least twenty pieces of hexagonal panel type elements and at least twelve pieces of pentagonal panel type elements, and that the radius of curvature of each panel type element has been shaped in such a way that, when assembled, the elements make up a hollow spherical object with a radius of not less than 1,5 meters, and that each panel type element is provided with an attachment and handling cap.

In addition to this, it is an object of the present invention to provide a method capable of attaining the foregoing goal of the invention.

This object is fulfilled according to the present invention in such a way that:

at least twenty pieces of blanks for a hexagonal panel type element and at least twelve pieces of blanks for a pentagonal element are formed, each panel type element blank is bent to an equal radius of curvature, from the foregoing blanks are fashioned at least twenty pieces of hexagonal panel type elements and at least twelve pieces of pentagonal elements, each panel type element is provided with an attachment and handling cap, from the bent panel type elements is fashioned a hollow spherical object by joining the panel type elements together, such that the spherical object's radius, which is not less than 1.5 meters, is consistent with the radius of curvature of each panel type element, and that the forming spherical object is rotated on top of a fluid medium.

Preferred embodiments of the present invention are presented in the dependent claims.

Figure 2:
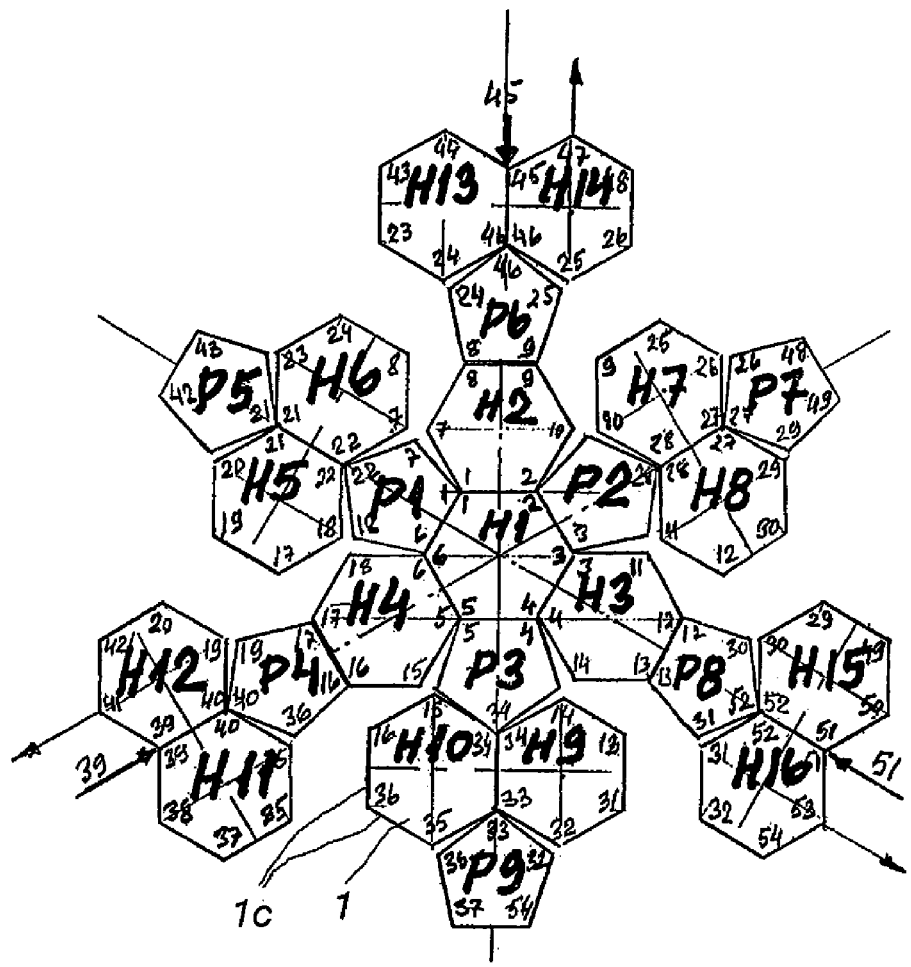
Figure 2:
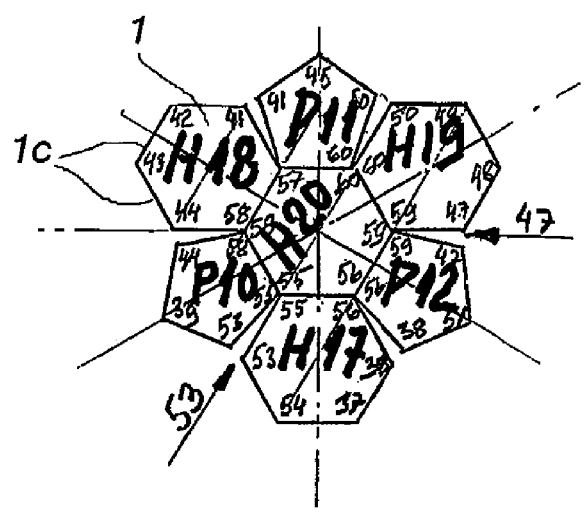
Figure 3A:
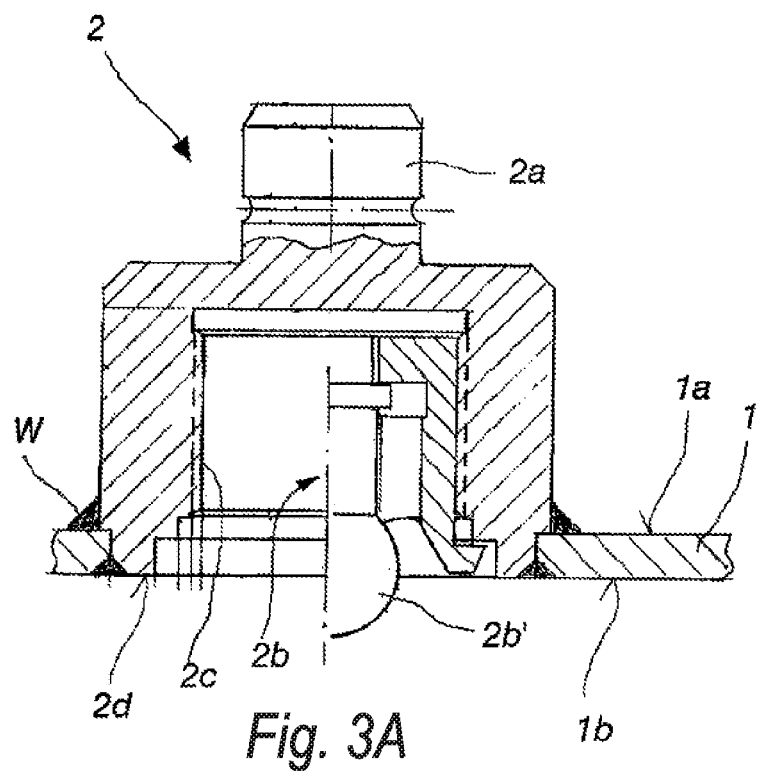
Figure 3B:
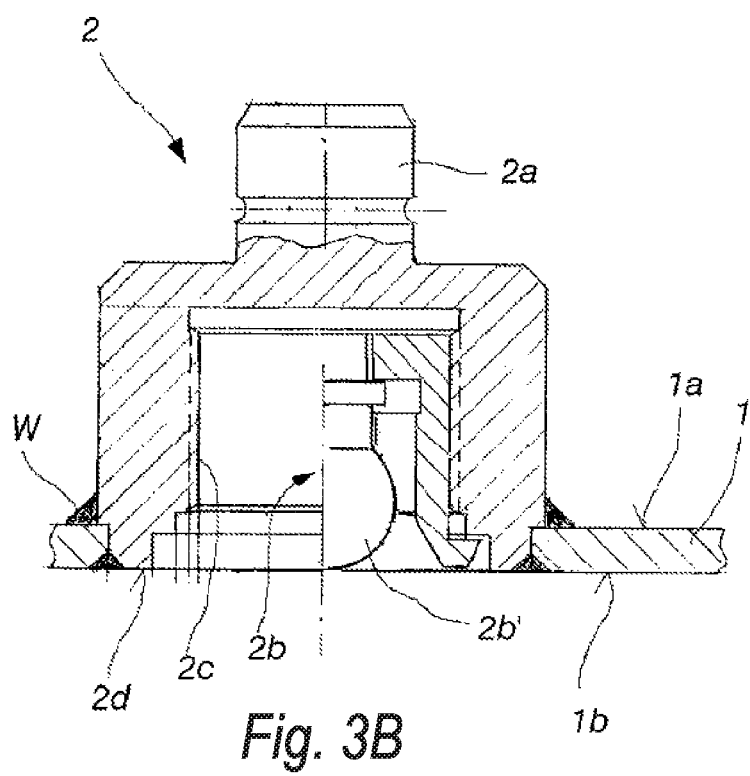
Figure 4:
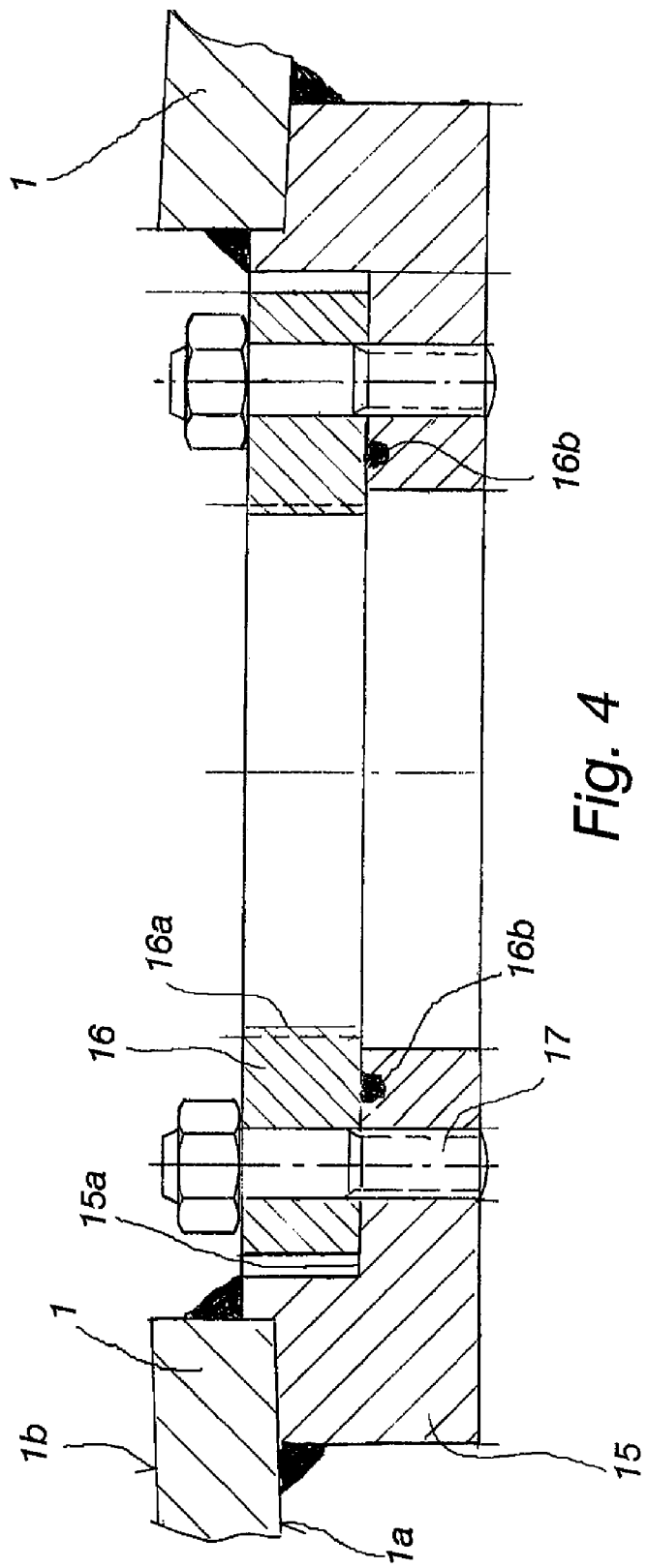
Figure 5:
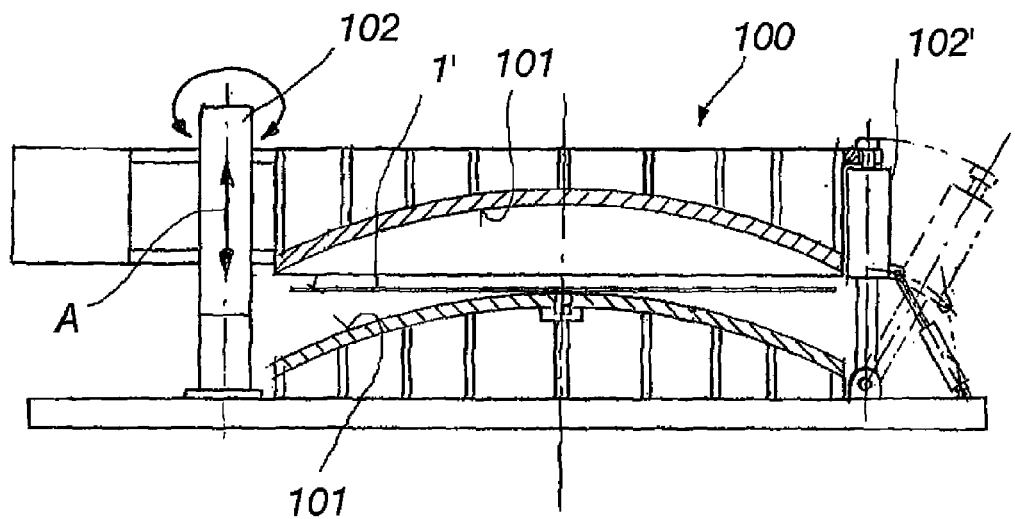
Figure 6:
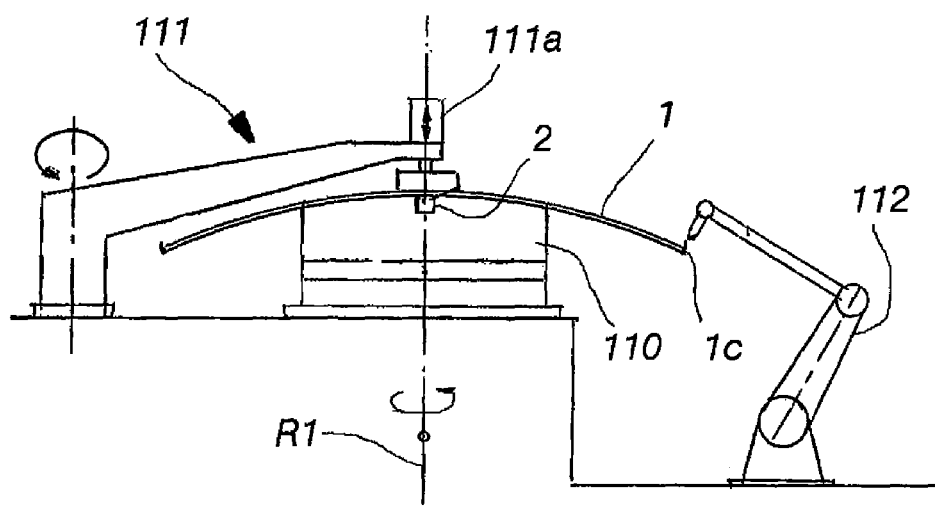
Figure 7:
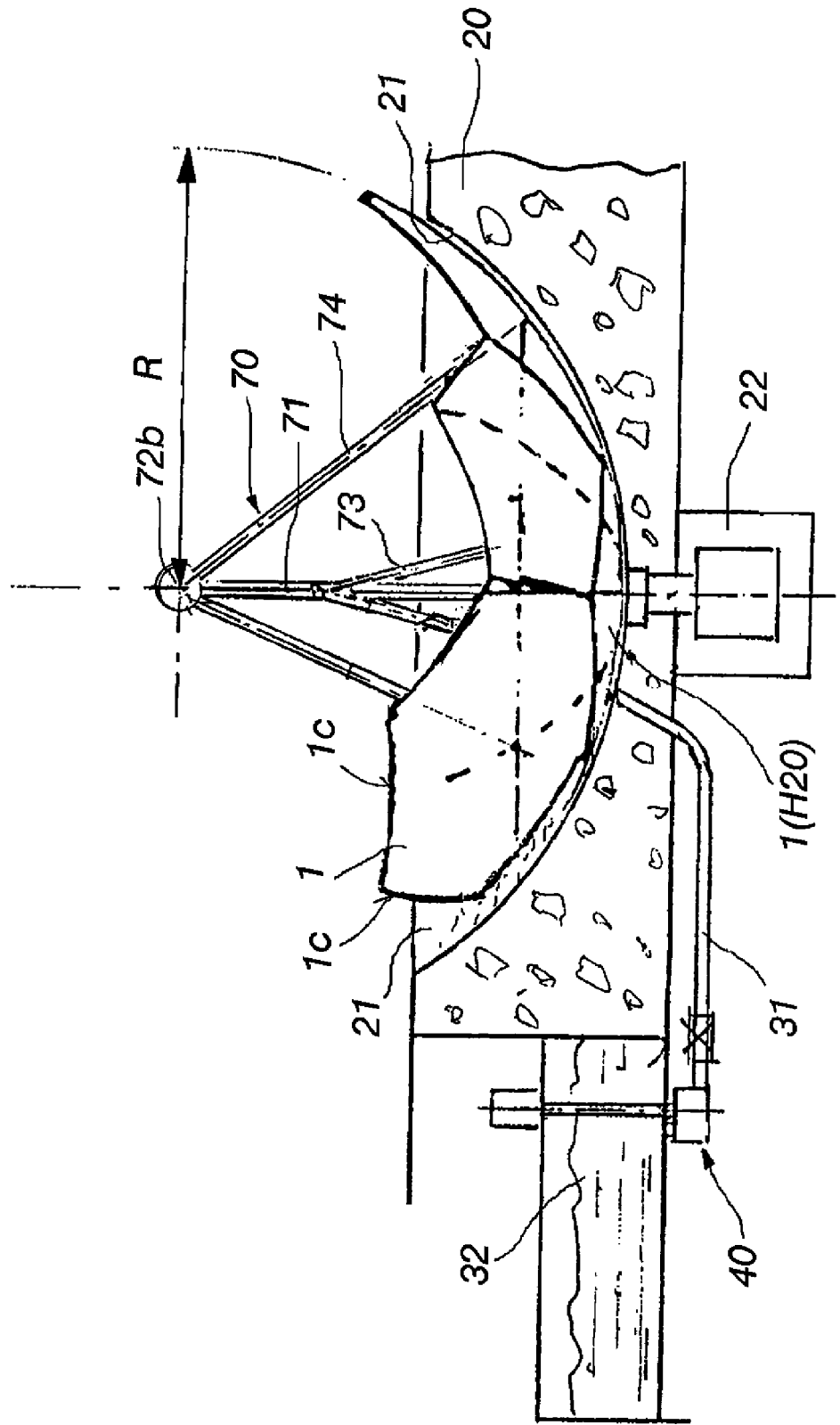
Figure 8:
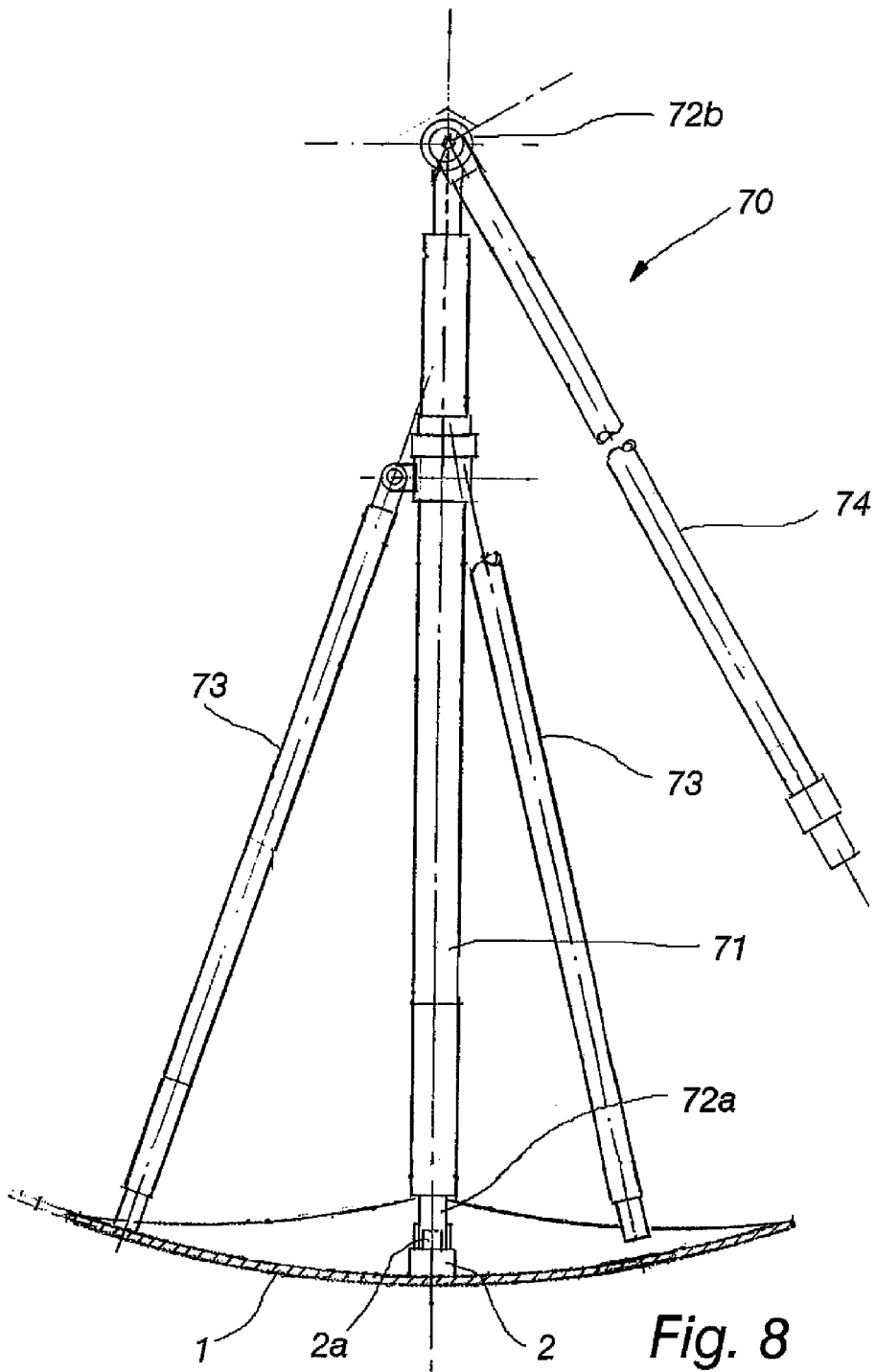
Figure 9:
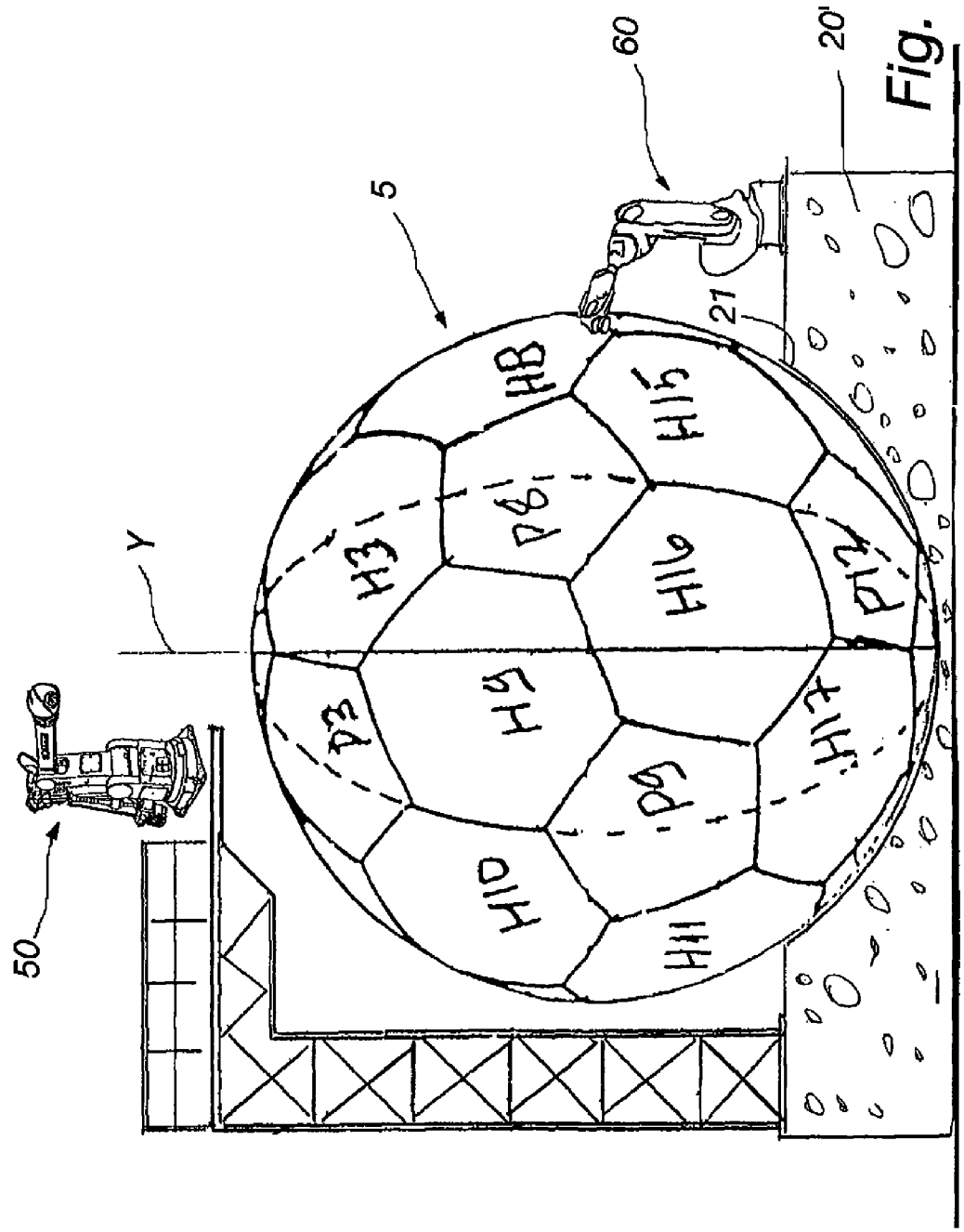

The present invention will now be described more closely with reference to the accompanying drawings, in which:

FIG. 1 shows a spherical object of the invention, which has been composed of panel type elements welded together, FIG. 2 shows the panel type elements and relative locations thereof in a plan view, FIGS. 3A and 3B show exemplary attachment and handling caps included in the panel type element, FIG. 4 shows in cross-section a gate provided in the panel type element, FIG. 5 shows a bending device for a blank of the panel type element, FIG. 6 shows a cutting device for the bent blank, used for trimming the blank's sides to hexa- or pentagonal shapes for a penta- or hexagonal panel type element, FIG. 7 shows an example for the configuration of a forming spherical object, FIG. 8 shows an example for an installation column of the invention, FIG. 9 shows an example for a spherical object welding system.

Reference is first made to the structure of a completed spherical object. Hence, FIG. 1 shows an example for a spherical object of the invention, designated with reference numeral 5. The spherical object of FIG. 1 consists of several joint parts 1. In this case, the parts are hexagonal and pentagonal panel type elements 1, and the relative positions thereof are depicted in a plan view in FIG. 2.

In FIG. 2, the hexagonal panel type elements are specified more precisely with reference numerals H1, H2, H3, H4, . . . , H20 and the pentagonal panel type elements are specified more precisely with reference numerals P1, P2, P3, . . . , P12. These specifications are here only to clarify a structure of the spherical object in more detail. Accordingly, the spherical object comprises at least twenty pieces of hexagonal panel type elements 1 and at least twelve pieces of pentagonal panel type elements 1.

In addition to this, each panel type element 1 has been formed with such a radius of curvature that in an assembled condition the panel type elements 1 make up a hollow spherical object 5. The radius of curvature is not less than 1.5 meters and, depending on the application, the radius of curvature can be determined to be practically any size. At its largest, a radius R of such a spherical object, for example the radius of a skin part in LNG containers (liquid nitrogen transport containers), is typically 20-30 meters. Of course, it is possible to fabricate spherical objects with an even larger radius. It should be noted that the spherical object manufacturing method will be described later in more detail.

A preferably employed material for the panel type elements 1 is steel, the material thickness of which varies depending on a given application and a radius (diameter) of the completed spherical object 5. In typical applications, the material thickness varies within the range of 1.5 to 2.5 cm, but may naturally be other than that. It is further beneficial that, at least in applications in which a spherical object is in contact with water (sea), the spherical object be coated, for example zinc plated, both internally and externally.

Each panel type element 1 of the spherical object 5 is provided with an attachment and handling cap, which is depicted in a partial cross-section in FIGS. 3A and 3B and designated with reference numeral 2. The attachment and handling cap 2 lies in the middle of each panel type element 1. The attachment and handling cap 2 has a body which is preferably cylindrical in shape and fixed, preferably by welding (a weld joint W), in a hole formed in the middle of a panel type element 1. The fixed attachment and handling cap 2, especially its forward surface 2d, is fitted in the hole in such a way that the forward surface 2d has its plane, in a radial direction of the spherical object, flush with the plane of an outer surface 1b of the panel type element 1 or inside said plane. The forward surface 2d is formed with a cylindrical space 2c, which is provided with an internal thread.

Moreover, the attachment and handling cap 2 includes elements 2a and 2b, which enable the spherical object 5 to be attached and handled from the side of the internal surface 1a and the external surface 1b also automatically as necessary. These elements 2a and 2b include here a first gripper element 2a. In this configuration, the first gripper element 2a comprises a spigot 2a, which extends into the interior of a spherical object from a within-the-spherical-object remaining rear surface of the attachment and handling cap's 2 cylindrical body and which can be here referred to as a first attachment spigot 2a. The second gripper element 2b is provided with an outer thread 2c, which meshes with the body's internal thread and by way of which the second gripper element 2b is removably attached to the attachment and handling cap's 2 body. The second gripper element 2b is provided with a spigot 2b', which extends in a radial direction of the spherical object essentially away from the center and which can be here referred to as a second attachment spigot. The head of the second attachment spigot has been preferably given a spherical shape. As shown in FIG. 3A, the midpoint of the spherical shape can be, in the radial direction of a spherical object 5, coplanar with the spherical object's 5 outer surface 1b. Alternatively, as shown in FIG. 3B, the attachment and handling cap 2 is in a radial direction of the spherical object arranged to be flush with the spherical object's 5 outer surface.

In addition to this, it is beneficial that the spherical object 5 be provided with at least one openable and closable gate. One example of such a gate is depicted in FIG. 4, in which the gate is designated with reference numeral 16. However, there are preferably more gates for various applications. These applications include a so-called manhole large enough for a person to make it inside the spherical object for maintenance procedures, for example. Another application for the gate 16 is a loading and/or unloading hatch, by way of which necessary materials can be delivered inside or brought out of the ball, such as, for example, in the purpose of zinc plating the surfaces of a spherical object 5 to be described later.

In FIG. 4, the gate 16 is supported by its edges on a preferably circular collar 15 welded along the periphery of an opening in the panel type element 1, specifically on a bearing ledge 15a formed in the collar 15. In a radial direction of the spherical object 5 (the panel type element 1), the collar 15 has its bearing ledges 15a at a distance inside the spherical object's 5 outer surface (the panel type element's 1 outer surface 1b). The above-mentioned distance is at least a distance equal to the gate's material thickness, preferably a distance 1.1 to 2 times the gate's material thickness, thus leaving the gate 16 inside the spherical object's 5 outer surface (the panel type element's 1 outer surface 1b). Close to the rim of the gate 16 are provided preferably mechanical fastening elements 17, such as bolts 17, by which the gate 16 is removably attached to the collar 15. The gate 16 is preferably made of a material which is the same material as a panel type element 1 it has been partnered with. The collar 15 has its bearing ledge 15a provided with a seal 16b, which is adapted to circle alongside the collar's 15 opening and to thereby provide a sealing between the gate's 16 periphery and the bearing ledge 15a for blocking for example the access of water inside the spherical object 5 by way of the gate 16.

Described next in more detail is a method for the fabrication of a spherical object 5 formed of several joint parts by making reference to the attached FIGS. 5-9.

FIG. 5 shows in a schematic view one blank 1' for a panel type element. First, the blanks 1' are produced in a number necessary for the fabrication of a spherical object 5. In this described embodiment 1' are produced twenty pieces of blanks for a hexagonal panel type element and twelve pieces of blanks for a pentagonal panel type element. The blank 1' comprises panel type (planar) elements cut close to measure.

This is followed by forming each blank 1' with an opening, in which is fitted an attachment and handling cap 2 shown in FIG. 3, as described above.

Furthermore, the blank 1' for each panel type element is bent to an equal radius of curvature. The blank is bent by means of a bending apparatus 100 shown in FIG. 5. The bending apparatus 100 comprises two press elements with two surfaces 101 fashioned for the same radius of curvature, between which each blank 1' is bent to the shape of a spherical surface. The bending is performed for example by using power units 102, 102', such as hydraulic cylinders, for pressing the upper press element and its arcuate surface 101 downwards against the lower press element, such that the blank 1' is retained (pressed) between the arcuate surfaces 101 while bending to be shape of a spherical surface. At this point it is also beneficial for the lower press element to be equipped with elements to which the blank 1' may attach by its attachment and handling cap 2 in order to make sure that the blank 1' remains stationary in the bending apparatus 100.

Next, the above-mentioned blanks are subjected to forming twenty pieces of hexagonal panel type elements and twelve pieces of pentagonal elements. For this, the blank 1' is positioned by the attachment and handling cap 2 in place on a circular table 110 or the like. The circular table is in turn provided with rotating means (not shown) for turning the blank 1' around a rotation axis R1 extending through the attachment and handling cap 2. The rotating means include for example a stepping motor, by which the circular table and thereby the blank 1' can be turned at a pitch of ⅙ and ⅕ of a circle (in other words, the corresponding angles of rotation for the respective circular pitches are 60 degrees and 72 degrees). The blank 1' is held stationary on the circular table 110 by means of a holding device 111. The holding device includes a holding element 111a, such as a pneumatic cylinder, by which the holding device 111 takes hold of the attachment and handling cap 2 and compresses the blank 1' thereby (essentially by the midpoint of the blank 1') against the circular table 110.

Thence, the blank's 1' sides 1c are processed by means of a precision cutting tool 112 located in the proximity of the circular table 110. Therein, the sides 1c of each blank 1' are cut straight one after the other, such that the blanks 1' of a spherical object result in the previously mentioned number of ready-to-use hexagonal panel type elements 1 (H1, H2, . . . , H20) and pentagonal panel type elements 1 (P1, P2, . . . , P12), which thus have already been bent to a radius of curvature consistent with the radius of a completed spherical object 5. This radius of curvature is not less than 1.5 meters. In practice, there is no upper limit to the radius of curvature, but in actual applications the radius of a completed spherical object 5 is maximally 30-40 meters.

Next described, with reference to FIGS. 7-9, is the joining (assembling) of ready-to-use panel type elements 1 for making a spherical object 5.

FIG. 7 illustrates a bowl 20, having its internal surface 21 consistent in shape with a spherical cap matching the diameter of a spherical object 5 being fabricated. Into the bowl 20 can be pumped by means of a pump 40 through a flow path 31 a fluid substance, in this case water 32, to a level at which the fully assembled spherical object 5 is carried by the water 32 so as to enable swirling the spherical object 5 on water by means of a robot 60 depicted in FIG. 9. The bowl 20 has its bottom provided with a spinning device 22, in the engagement with which is also arranged a hexagonal panel type element H20 singled out in FIG. 2. The coupling is provided by means of the attachment and handling cap's 2 second attachment spigot 2*b*'.

In a preferred embodiment of the invention, it is beneficial that the actual assembly process be preceded by mounting an installation column 70 in connection with the attachment and handling cap's 2 first attachment spigot 2*a*. One preferred embodiment of the installation column 70, regarding its more detailed construction and connection with the panel type elements 1, is shown in FIG. 8.

The installation column 70 comprises a central post 71, whose first end 72*a* has been extended to the engagement with the first attachment spigot 2*a* of a panel type element 1 (H20). The attachment spigot 2*a* is preferably in such a position that the central post 71 assumes a vertical position. A second end 72*b* of the central post 71 is adapted for free rotation and has bearing-mounted thereon at least one installation arm 74 (FIG. 7 illustrates two installation arms), which therefore swivels freely also towards the attachment and handling cap 2 of the subsequently assembled panel type elements 1. The pivoting point lies precisely at the midpoint of a subsequently formed spherical object 5. This above-mentioned bearing assembly also constitutes a pivoting point for the central post 71, around which the central post's 71 top end (second end 72*b*) is capable of rotating. The central post 71 is propped up with at least three bracing arms 73 (FIGS. 7 and 8 reveal two out of three bracing arms 73, the third one is behind the second one), whose ends are propped on the edges of that panel type element 1 which has the central post 71 brought in connection therewith. This enables ensuring that the central post 71 aligns itself for a vertical position and the above-mentioned pivoting point is positively secured to the midpoint of a subsequently formed spherical object 5.

With the assistance of such an installation column 70, the assembly process is begun by using the installation arm 74 to lift panel type elements 1 (H17, P10, H18, P11, H19 and P12, see FIG. 2) alongside the panel type element 1 (H20). These are welded from the inside of a subsequently formed spherical object 5 with a thin, yet waterproof weld together by the opposing edges 1*c* thereof. This is followed by pumping so much water 32 into the bowl 20 that a portion of the spherical object 5 is resting on water 32, whereby a portion of the spherical object 5 is rotated by the rotating device 22 to an attachment position of the next panel type element 1 and water 32 is drained from the bowl 20. The installation arm 74 is attached to the next panel type element 1 (P9), which is welded from H17. All remaining elements are welded in a similar manner. Thereby is obtained a spherical object 5.

Under this assembly into the bowl can be conducted a fluidic substance, in this case water 32, capable of carrying the spherical object 5. Hence, the spherical object 5 can be freely rotated and swirled by an appropriate robot or manually upon the water. The final panel type element 1 (H1) preferably includes a manhole 16 shown in FIG. 4.

It should be mentioned here that the panel type elements 1 are dimensioned and shaped in such a way that, when assembled together, the corners of the panel type elements 1 are located on the surface of the spherical object 5 in positions which correspond to positions of the carbon atoms of fullerene consisting of at least sixty carbon atoms.

The assembly process is followed by actual welding, which is conducted in a welding bowl on seam segments external of the spherical object 5 between the panel type elements 1. This can be conducted in the same bowl 20, which has been supplemented with a main welding station 50 shown in FIG. 9, as well as with rotating means 60, in this case a rotating robot 60.

Alternatively, welding is performed in a separate bowl, which is practically identical to the bowl 20. Therefore, the welding bowl depicted in FIG. 9 has also been indicated with reference numeral 20'. In this case, the assembled spherical object 5 is carried along a separate transfer track, such as rails (not shown), to this main welding station 50 equipped with a bowl 20'. The main welding station 50 is mounted for example on a working platform reaching a level above the spherical object 5 and arranged in a scaffold tower coincident with the welding bowl 20'.

The spherical object 5 is clamped in place for welding by two second attachment spigots 2*b*' of the attachment and handling cap 2, which are also preferably always positioned (highest and lowest) in line with a vertical axis Y extending through the midpoint of a spherical object 5. On the surface of a spherical object 5 there are always second attachment spigots 2*b*' in a radial direction of the spherical object 5 exactly on the opposite sides of the spherical object 5 as a result of the relative locations of the panel type elements 1 of the spherical object 5. Hence, the vertical axis Y becomes a (clamped) rotation axis for the spherical object 5 (regardless of which opposite second attachment spigots 2*b*' are after rotation in line with the vertical axis Y), around which the spherical object 5 rotates in response to being turned by the rotating robot 60. For this, the rotating robot 60 is equipped with a gripper element for taking hold of some other second attachment spigot 2*b*' present on the surface of a spherical object 5.

Accordingly, the main welding station 50 has its welding robot arranged to reach sufficiently far for welding at least one edge 1*c* of the topmost hexagonal panel type element 1. Thus, upon a fluidic substance present in the bowl 20', each edge 1*c* of a relevant panel type element 1 of the spherical object 5 is turned sequentially by the rotating robot 60 into the range of the welding robot. At its simplest, this enables a welding process, wherein welding the seams of an entire spherical object 5 requires one, not more than two types of weld runs by which are covered all forms of weld joints between the panel type elements 1 regardless of whether the spherical object is clamped from above onto its rotation axis Y by a pentagonal or hexagonal panel type element 1. This, in turn, enables a fully automated welding process for the spherical object 5. The welding robot (main welding station 50) has always a panel type element 1 in a precisely known location and in a correct position. Welding can be conducted by some known high capacity welding technique, for example by powder welding technique.

Next, it is preferred that the above-described spherical object 5 be hot zinc plated simultaneously over both its outer surface 1*b* and its inner surface 1*a*. This is conducted by lowering the spherical object 5 to float in a zinc plating tank on top of molten zinc (a substance intended for zinc plating). At the same time, an adequate amount of the substance (molten) for zinc plating is placed inside the spherical object, said amount being sufficient for zinc plating at least the internal surface 1*a*. The zinc plating proceeds in such a way that a gripper robot (not shown) or several gripper robots take hold of the second attachment spigots 2*b'*, the number of which is still 32 on the spherical object. By rotating a spherical object this way in the zinc plating tank, the gripper robot (robots) is able to conduct zinc plating automatically as an unmanned process. After this zinc plating swirl, as the panel type element 1 (H1) with the manhole 16 is set precisely at the topmost position, it is beneficial to make sure that inside the ball remains a surplus of the substance for zinc plating, the surplus being for example 100-200 kg, which is followed by lifting the spherical object from the zinc plating tank to cool. Thus, the surplus cools and sets on the bottom of the spherical object 5 on the side opposite to a spot of the spherical object 5 in which the manhole 16 is located. This hardened matter establishes a counterweight capable of ensuring that, in operation on the sea or in water, the spherical object 5 floats with the manhole 16 precisely upwards. This can be followed by disengaging the removable second gripping elements 2*b* (including also the second attachment spigot 2*b'*) included in the attachment and gripping elements 2.

The present invention is not limited solely to the presented embodiment, but finds a multitude of applications within the scope of protection defined in by the claims.

I claim:

1. A spherical object, comprising:
   at least twenty curved hexagonal panel type elements; and
   at least twelve curved pentagonal panel type elements;
   wherein each panel type element includes an attachment and handling cap, each attachment and handling cap including an internal gripper element that is configured to be graspable from within the spherical object, and an external gripper element that is configured to be graspable from outside the spherical object; and
   each panel type element is configured such that, when assembled, the elements form a hollow spherical object with a radius of not less than 1.5 meters that can be moved by the external and internal gripper elements.

2. The spherical object of claim 1, further comprising at least one openable and closeable gate disposed in at least one panel type element, such that the gate is within an outer surface of the at least one panel type element.

3. The spherical object of claim 1, wherein adjacent panel type elements are attached to each other via one or more welds.

4. The spherical object of claim 1, wherein each panel type element includes a metal material or a metal alloy material.

5. The spherical object of claim 4, wherein each panel type element includes a steel material.

6. The spherical object of claim 1, wherein the spherical object is assembled such that the corners of the panel type elements are disposed on the surface of the spherical object at positions that substantially correspond to positions of carbon atoms of a fullerene consisting of at least sixty carbon atoms.

7. The spherical object of claim 1, wherein each attachment and handling cap is oriented along a radius of the spherical object and is at least one of flush with the spherical object's outer surface and inside the curve defined by the outer surface of the spherical object.

8. A spherical object, comprising:
   twenty hexagonal panel type elements; and
   twelve pentagonal panel type elements;
   wherein each panel type element has been shaped to define a radius of curvature;
   each panel type element includes an attachment and handling cap having an internal gripper element and an external gripper element;
   at least one panel type element includes an openable and closeable gate inset into an outer surface of the at least one panel type element; and
   wherein the panel type elements are arranged in a truncated icosahedron to define the spherical object such that the spherical object has a radius of not less than 1.5 meters and can be moved by the external and internal gripper elements.

* * * * *